No. 614,159. Patented Nov. 15, 1898.
J. H. BARR.
BICYCLE BRAKE.
(Application filed Apr. 13, 1896.)
(No Model.) 2 Sheets—Sheet 1.
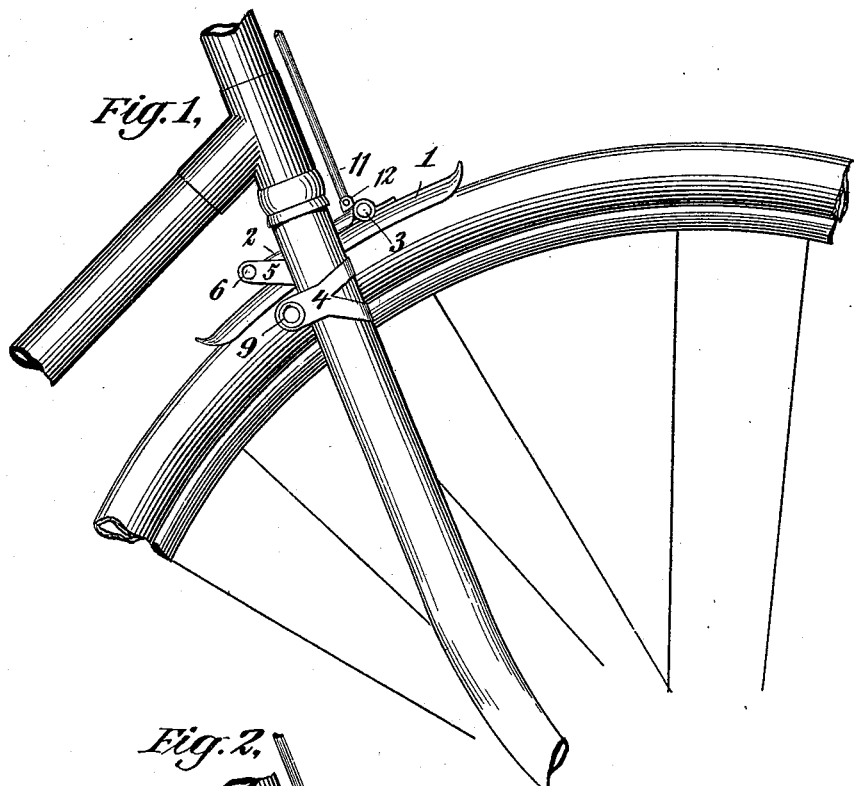
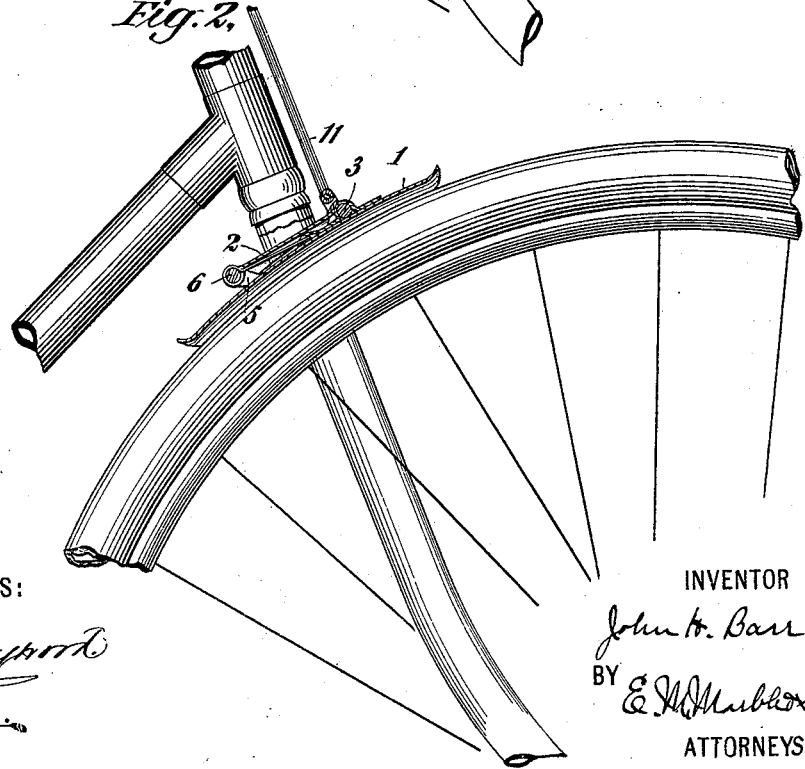
WITNESSES:
INVENTOR
John H. Barr
BY
ATTORNEYS No. 614,159.  
J. H. BARR.  
BICYCLE BRAKE.  
(Application filed Apr. 13, 1896.)  
Patented Nov. 15, 1898.
(No Model.) 2 Sheets—Sheet 2.
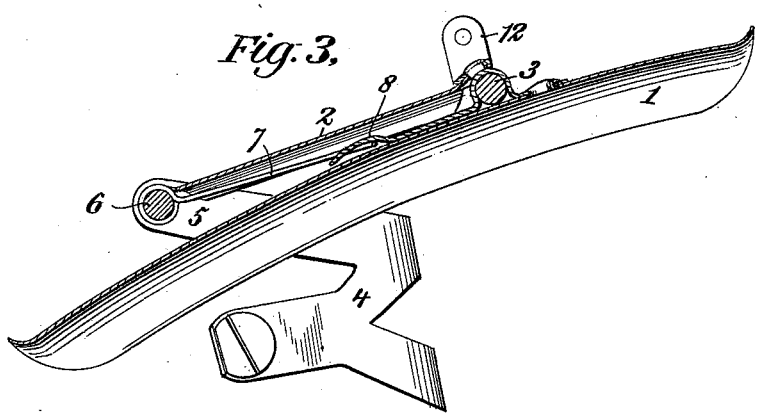
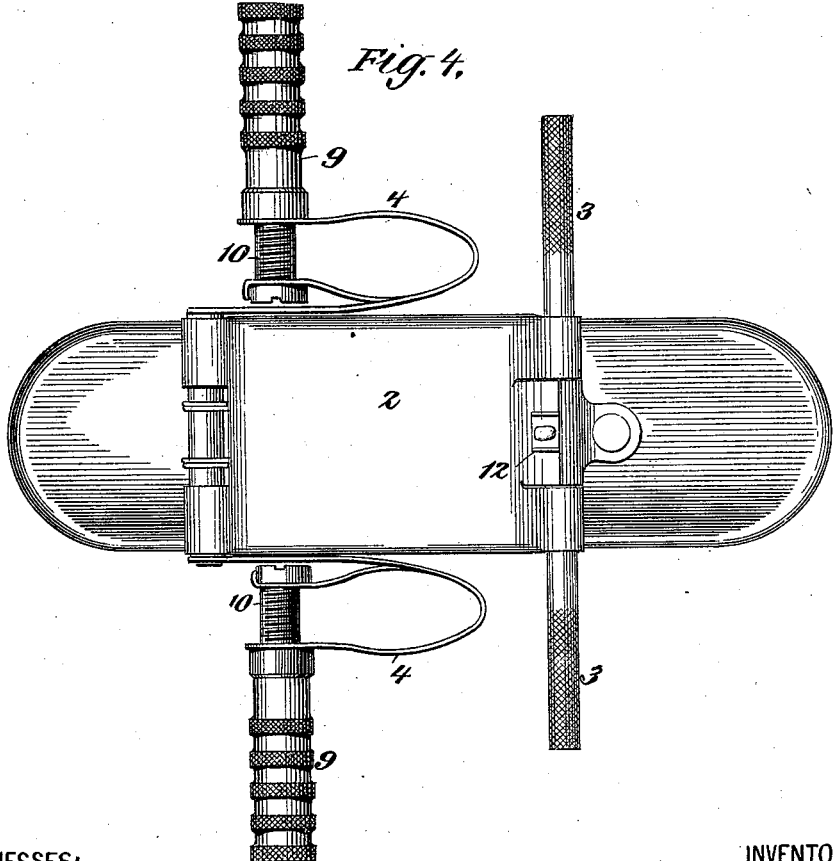
WITNESSES:  
INVENTOR  
John H. Barr  
BY  
ATTORNEYS

UNITED STATES PATENT OFFICE.

JOHN H. BARR, OF ITHACA, NEW YORK.

BICYCLE-BRAKE.

SPECIFICATION forming part of Letters Patent No. 614,159, dated November 15, 1898.

Application filed April 13, 1896. Serial No. 587,279. (No model.)

*To all whom it may concern:*

Be it known that I, JOHN H. BARR, a citizen of the United States, residing at Ithaca, in the county of Tompkins and State of New York, have invented certain new and useful Improvements in Brakes for Bicycles and other Similar Vehicles; and I do hereby declare the following to be a full, clear, and exact description of the invention, such as will enable others skilled in the art to which it appertains to make and use the same.

My invention relates to brakes for bicycles and similar vehicles, and particularly to a construction of brake whereby a brake-shoe of considerable length may be brought into contact with the tire of the wheel throughout the length of the brake-shoe, so that it may be possible to apply unusually great pressure to the brake-shoe, and thereby secure a very great retarding effect, without excessive pressure upon any portion of the tire, such as might cause injury to it.

My brake is particularly adapted for use with hollow pneumatic or cushion tires.

My invention consists in the novel construction, combination, and arrangement of the parts of the brake.

The object of my invention is to make the brake compact, light, and durable, composed of parts which may be formed of sheet-metal stampings or forgings at small expense and which may be fitted to the bicycle or other vehicle at a point where it shall not be in the way and may be easily and effectively operated. This object is attained in the invention herein described, and illustrated in the drawings which accompany and form a part of this application, in which the same reference-numerals indicate the same or corresponding parts, and in which—

Figure 1 is an elevation of a portion of the front fork and front wheel of a bicycle with my brake attached. Fig. 2 is a similar view, one leg of the front fork having been removed and the brake having been sectioned centrally to show its construction more clearly. Fig. 3 is a central longitudinal section of the brake detached from the wheel, and Fig. 4 is a top view of the brake detached.

In the drawings, 1 is the brake-shoe. It is of considerable length, so as to have a comparatively large bearing or friction surface, and is trough-shaped, so as to bear upon the sides of the tire as well as or instead of upon the top of the tire.

2 is a supporting-plate having at its sides flanges to give it stiffness, to which the brake-shoe is hinged by a pintle-rod 3, which projects considerably beyond each side of the brake-shoe 1, the rod 3 forming foot-pieces by which the brake may be pressed against the wheel. The joint between the brake-shoe 1 and the supporting-plate 2 is a loose hinged or pivotal joint.

4 4 are clamps arranged to clamp about the legs of the front fork of the bicycle and are provided with horns 5, to which the supporting-plate 2 is hinged at its rear end by a pintle 6. The pintle 6 carries a spring 7, engaging with a hook 8 upon the top of the brake-shoe and tending to lift the brake-shoe by turning it first with respect to the plate 2 and then, when the top of the brake-shoe is in contact with the supporting-plate 2, by turning the supporting-plate 2 about the pintle 6. The upward movement of the brake-shoe and supporting-plate is of course limited by the front fork of the bicycle.

The clamps 4 are clamped to the front forks by the ordinary nut and screw and may also carry coaster foot-rests. As shown in the drawings, the nuts 9, screwing upon the screws 10 and tending to press the arms of the clamps together, are extended, so as to form the coasters. The screws 10 are each flattened upon one side, and the branch of the coaster-bracket in proximity to the head of each screw is turned at right angles, so as to make contact with the flattened side of the screw and prevent rotation thereof.

The manner of applying and using my brake is as follows: The brake is first applied to the wheel by removing the foot-rests 9 and screws 10 from the clamps 4 and slipping the clamps upon the front forks of the bicycle, adjusting their position upon the front forks so that in its normal position the brake-shoe will be clear of but substantially parallel with the tire. The screws 10 are then passed through the clamps with the flattened sides of their heads against the outturned lips of the coasters, so as to be held from turning, and the foot-rests 9 are screwed over the screws upon the front forks. The brake is then in readiness for operation. To operate the brake, the feet are placed upon the projecting ends of the rod 3 and are pressed downward. The brake-shoe 1 and supporting-plate 2 first swing about the pintle 6, so that the front of the brake-shoe 1 is first brought into contact with the tire. Further downward pressure of the foot causes the brake-shoe 1 next to swing at its joint with the plate 2, so as to lower the rear end of the brake-shoe, bringing the whole length of the shoe into contact with the tire. The retarding effect of the brake-shoe when in contact with the tire may be easily regulated with considerable nicety by varying the pressure on the rod 3, so as to produce exactly the retarding effect desired. When the pressure of the foot is released, the spring 7 lifts the brake, lifting first the rear end of the brake-shoe by swinging the shoe about the joint with the plate 2 and then swinging both the brake-shoe and the supporting-plate 2 about the pintle 6, so as to lift the brake-shoe 1 clear of the tire.

The brake may be operated as a hand-brake as well as a foot-brake by connecting the supporting-plate 2 to an ordinary hand-brake lever, and in Figs. 1 and 2 the brake is shown connected to an ordinary brake-rod 11, leading to a hand-lever. (Not shown in the drawings.)

In Figs. 3 and 4 the brake is shown provided with a bracket 12 for the attachment of the brake-rod 11.

The brake-shoe 1, supporting-plate 2, and supporting-clamps 4 4 are so formed that they may be stamped from sheet metal and pressed into shape by dies. They may also be drop-forgings. They may therefore be made very strong and at the same time very light, and because they may be formed from sheet metal by stamping or may be drop-forgings the brake may be constructed very cheaply.

Having thus completely described my invention, what I claim, and desire to secure by Letters Patent, is—

1. In a brake for bicycles and other vehicles, the combination, with a supporting-plate adapted to be secured to the frame of the vehicle and movable toward and from the wheel, when so secured, for the purpose of applying and releasing the brake, of a brake-shoe pivotally attached to the free end of said plate and adapted to extend longitudinally of the wheel, and a spring acting upon said brake-shoe at a point not coincident with its point of attachment to the supporting-plate, and tending to draw the brake-shoe and supporting-plate away from the wheel, whereby said spring normally holds the entire brake-shoe raised from the wheel, and holds one end of the brake-shoe raised from the wheel, even after sufficient pressure has been applied to cause the other end of the shoe to contact with the wheel, substantially as described.

2. In a brake-shoe for bicycles and other vehicles, the combination, with a supporting-plate, and means for pivotally supporting the same at one end from the frame of the vehicle, the other end being movable toward and from the wheel, of a brake-shoe pivotally attached to the free end of said plate, a rod extending on either side of said brake-shoe at its point of support, and a spring mounted on the pivotal support of said plate and attached to said brake-shoe at a point intermediate between the pivotal support of said plate and the pivotal support of said brake-shoe, substantially as described.

3. In a brake-shoe for bicycles and other vehicles, the combination, with a supporting-plate, and means for pivotally supporting the same at one end from the frame of the vehicle, the other end being movable toward and from the wheel, of the brake-shoe 1 formed to receive the rod 3 and with a lip or flange 8, the rod 3 pivotally connecting said plate and said brake-shoe, said rod extending outward on either side of said brake-shoe to form foot-rests, and a spring mounted on the pivotal support of said plate and bearing against the lip 8 of said brake-shoe, substantially as described.

4. In a vehicle-brake, a shoe, a lever to one end of which the shoe is pivoted and a spring adapted to control the movement in one direction of both shoe and lever, and means for operating the lever against the tension of the spring, said lever, shoe and spring being so arranged that when said lever is actuated the shoe is first presented in angular contact with the wheel of the vehicle from the bottom of the shoe and thereafter moves upon its pivotal connection with the lever against the tension of the spring and is brought flat down upon or against the vehicle-wheel.

In testimony whereof I affix my signature in presence of two witnesses.

JOHN H. BARR.

Witnesses:
O. P. HYDE,
WM. E. BREWER.